(12) United States Patent
Bradburn

(10) Patent No.: US 7,543,849 B2
(45) Date of Patent: Jun. 9, 2009

(54) INFLATABLE AIR-BAG

(75) Inventor: Alan Bradburn, Staffordshire (GB)

(73) Assignee: Autoliv Development AB, Vargarda (SE)

( * ) Notice: Subject to any disclaimer, the term of this patent is extended or adjusted under 35 U.S.C. 154(b) by 380 days.

(21) Appl. No.: 10/574,516

(22) PCT Filed: Oct. 14, 2004

(86) PCT No.: PCT/SE2004/001470

§ 371 (c)(1),
(2), (4) Date: Apr. 3, 2006

(87) PCT Pub. No.: WO2005/037613

PCT Pub. Date: Apr. 28, 2005

(65) Prior Publication Data

US 2006/0290116 A1 Dec. 28, 2006

(30) Foreign Application Priority Data

Oct. 16, 2003 (GB) ................................. 0324291.4

(51) Int. Cl.
*B60R 21/239* (2006.01)
(52) U.S. Cl. ..................... 280/739; 280/743.1
(58) Field of Classification Search .............. 280/743.1, 280/739
See application file for complete search history.

(56) References Cited

U.S. PATENT DOCUMENTS

| 3,820,814 | A | | 6/1974 | Allgaier |
| 4,111,458 | A | * | 9/1978 | Okada et al. ................. 280/739 |
| 5,492,363 | A | | 2/1996 | Hartmeyer et al. |
| 6,095,557 | A | | 8/2000 | Takimoto et al. |
| 6,726,242 | B2 | * | 4/2004 | Moon .......................... 280/739 |
| 2002/0047253 | A1 | | 4/2002 | Rasch et al. |

FOREIGN PATENT DOCUMENTS

| DE | 196 33 883 A1 | | 2/1998 |
| DE | 298 04 005 U1 | | 7/1998 |
| JP | 6-286570 A | * | 10/1994 |
| JP | 2001-2777991 A | * | 10/2001 |
| JP | 2002-079905 A | | 3/2002 |

* cited by examiner

*Primary Examiner*—Ruth Ilan
(74) *Attorney, Agent, or Firm*—Harness, Dickey & Pierce, P.L.C.

(57) ABSTRACT

An inflatable airbag is disclosed which defines an inflatable chamber. The airbag generally includes an inner elastic membrane provided in the peripheral wall of the airbag and a vent-hole formed through the elastic membrane. An outer membrane is provided on the outside of the airbag that extends across at least part of the inner membrane and the vent-hole. The outer membrane defines a pucker over the inner membrane and the vent-hole. The pucker is open so as to define an outlet flow path from the vent-hole when the inner membrane is spaced from the pucker. The inner membrane is configured to stretch and seal against the pucker around the vent-hole when the internal pressure within the inflatable chamber exceeds a predetermined value.

19 Claims, 2 Drawing Sheets

INFLATABLE AIR-BAG

CROSS-REFERENCE TO RELATED APPLICATIONS

This application claims the benefit and priority of GB 0324291.4, filed 16 Oct. 2003. This application is a National Stage of International Application No. PCT/SE2004/001470, filed 14 Oct. 2004. The entire disclosures of the above applications are incorporated herein by reference.

FIELD

THE PRESENT INVENTION relates to an inflatable airbag, and more particularly to an airbag to be mounted in a motor vehicle as a safety device to provide cushioning to an occupant of the vehicle in the event that the vehicle is involved in a crash situation.

BACKGROUND

It is known to vent an airbag provided for use in a motor vehicle to protect an occupant of the vehicle in the event that an accident should occur, especially if the airbag is of the type intended to provide protection in the event that a front impact should occur.

An airbag that is intended to provide protection in the case of a front impact is generally located so that, when inflated, the airbag is positioned in front of the occupant to be protected. Such airbags are typically provided within the dashboards or steering wheels of motor vehicles to protect the occupants from impact with the hard structures behind the airbag.

During a front impact, the motor vehicle decelerates suddenly. Due to inertia, the occupant of the vehicle tends to continue moving, and thus the occupant of the vehicle is, in effect, moving forwardly relative to the rest of the vehicle. The function of the airbag is to decelerate the occupant, preferably in such a way that the occupant suffers no injury. The airbag must be inflated very swiftly and thus, typically, contains relatively high pressure gas. If the airbag were not vented, then because of the gas pressure within it, the airbag would not decelerate the occupant gently, but instead would stop the occupant extremely swiftly and hence may injure the occupant. Thus, many airbags are provided with vent-holes formed in them so that, when the airbag is struck by the occupant, gas can escape from the airbag through the vent-hole or holes, so that the airbag serves the function of decelerating the occupant more gently, to avoid such injury.

In many cases, it has been found to be desirable to control the degree of venting. For example, in a low load accident situation, such as a slow speed accident or an accident in which the occupant to be protected by the airbag is of relatively low mass, then a relatively high degree of venting is appropriate to safely decelerate the occupant. However, in a high load accident, for example a high speed accident, or an accident in which the seat occupant has a relatively high mass, and hence high inertia, a lower degree of venting is often desirable in order to prevent the seat occupant "striking through" the airbag and suffering injury from impact with dashboard or steering wheel structures located behind the airbag.

SUMMARY

It is therefore desirable to provide an effective means to selectively close a vent-hole provided in an airbag, depending upon the load conditions of the accident situation.

The present invention seeks to provide an improved inflatable airbag.

According to the present invention, an inflatable airbag defines an inflatable chamber for fluid connection to an inflator having an elastic inner membrane provided in the peripheral wall of the airbag; a vent-hole formed through the elastic membrane; and an outer membrane provided on the outside of the airbag so as to extend across at least part of the inner membrane and the vent-hole. The outer membrane defines a pucker over the part of the inner membrane, the pucker being open so as to define an outlet flow path from the vent-hole when the part of the inner membrane is spaced from the pucker. The inner membrane stretches and seals against the pucker, around the vent-hole, when the internal pressure within the inflatable chamber exceeds a predetermined value.

Preferably, the inner membrane is made of silicone.

Advantageously, the inner membrane has more than one vent-hole.

Conveniently, the airbag is made of fabric and the inner membrane is secured across an aperture formed in the fabric.

Preferably, the inner membrane is stitched to the fabric of the airbag.

Advantageously, the inner membrane is glued to the fabric of the airbag.

Conveniently, the outer membrane comprises a strip of fabric stitched to the airbag.

Preferably, the pucker takes the form of a loose fold across the outer membrane and is open at both of its ends.

Advantageously, the outer membrane is integral with the material of the airbag defining the inflatable chamber.

BRIEF DESCRIPTION OF THE DRAWINGS

So that the invention may be more readily understood, and so that further features thereof may be appreciated, an embodiment of the invention will now be described, by way of example, with reference to the accompanying drawings, in which.

DETAILED DESCRIPTION

Figure 1:
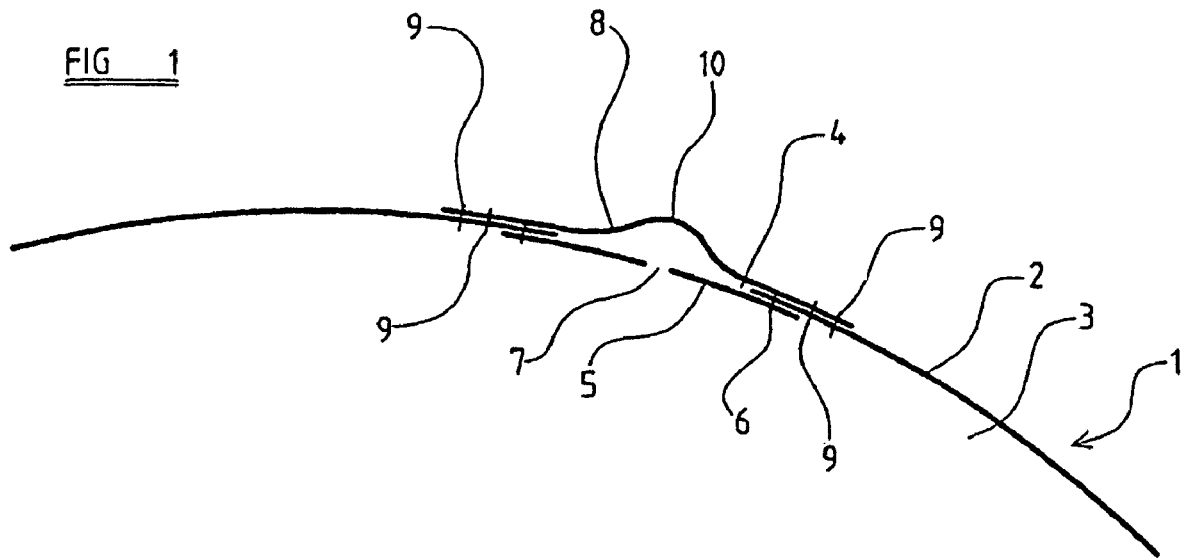
FIG. 1 is a schematic sectional view taken through part of an airbag in accordance with the present invention illustrating a vent-hole arrangement.
Figure 2:
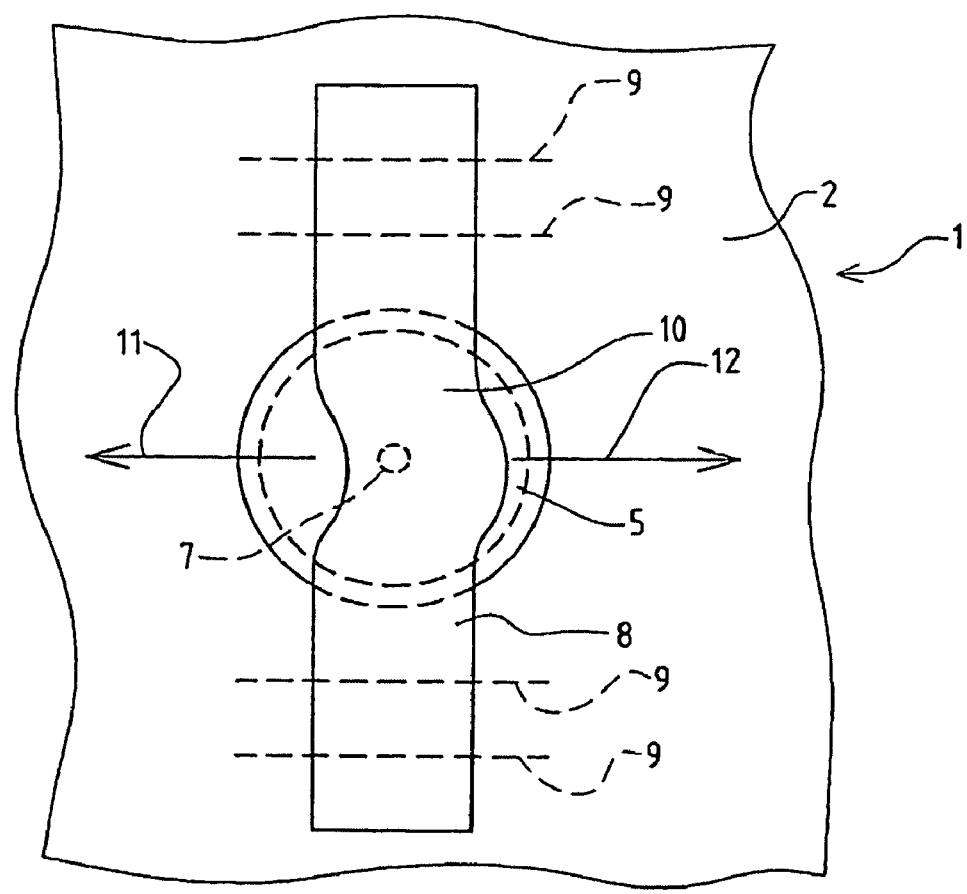
FIG. 2 is a view from above of the vent-hole arrangement illustrated in FIG. 1.

Referring initially to FIGS. 1 and 2 of the accompanying drawings, there is illustrated an inflatable airbag 1 which comprises an envelope of flexible material 2 such as, for example, woven fabric material, which defines an inflatable chamber 3 for fluid connection to an inflator (not illustrated) in a manner known per se. The fabric 2 defines a peripheral wall of the airbag 1.

An aperture 4 is provided through the fabric 2 of the airbag 1, across which an elastic inner membrane 5 is provided. It will be seen from FIG. 2, that in the specific embodiment illustrated the inner membrane 5 is substantially circular, although it will be appreciated that in alternative embodiments, different shapes of inner membrane could be used. In the preferred embodiment of the invention, the inner membrane 5 is made of silicone. It will be seen that the inner membrane 5 is secured to the fabric 2 of the airbag 1 around its periphery. The inner membrane 5 may be secured to the fabric 2 by any convenient means such as, for example, by way of a line of peripheral stitching 6. Alternatively, or additionally, the inner elastic membrane 5 can be glued to the fabric 2 of the airbag 1.

A small vent-hole 7 is provided through a substantially central part of the inner membrane 5.

An outer membrane 8 is provided on the outside of the airbag 1, located on the opposite side of the inner membrane 5 to the inflatable chamber 3. The outer membrane 8 preferably takes the form of a strip of fabric material, as illustrated in FIG. 2. However, it is envisaged that other materials, instead of fabric, could be used for the outer membrane 8 provided the material has a lower degree of elasticity than the inner membrane 5. The outer membrane 8 illustrated in FIG. 2 is of generally elongate rectangular form and it will be seen that the membrane 8 is secured to the peripheral wall of the airbag 1 by lines of stitching 9. However, it is also envisaged that the outer membrane 8 could be part of the airbag fabric 2.

The strip of fabric defining the outer membrane 8 extends across at least the central region of the inner elastic membrane 5, and as illustrated in FIGS. 1 and 2, the ends of the outer membrane 8 are stitched to the airbag 1 on opposed sides of the inner membrane 5. The outer membrane 8 is configured so as to define a pucker 10 in the form of a loose fold or bulge which is located above the vent-hole 7 provided through the inner membrane 5. As illustrated most clearly in FIG. 2, the pucker 10 extends transversely across the fabric strip defining the outer membrane 8 and is open at both ends so as to define a gas flow path from the vent-hole 7 to atmosphere (as illustrated by arrows 11, 12 in FIG. 2).

FIG. 1 illustrates the vent-hole arrangement in a relaxed condition in which the elastic membrane 5 is stretched lightly across the aperture 4 provided in the fabric 2.

Figure 3:
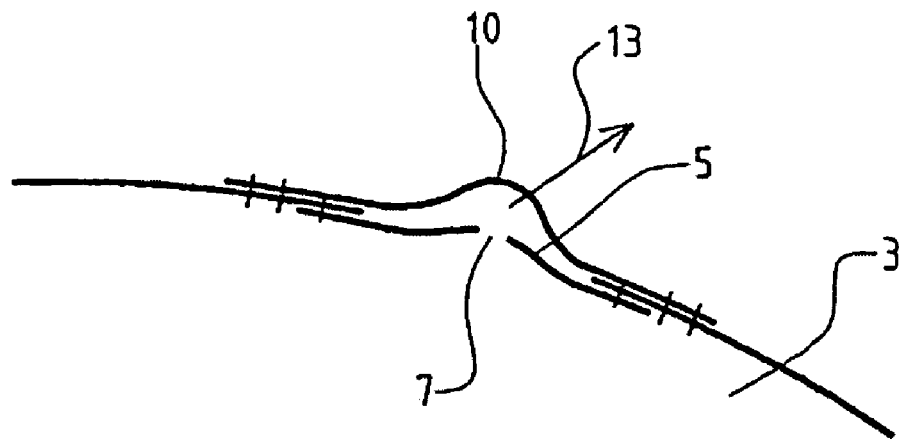
FIG. 3 is a view corresponding generally to that of FIG. 1, illustrating the vent-hole arrangement during a low-load impact situation.

FIG. 3 illustrates the vent-hole arrangement in a condition which it adopts during a low-load impact situation, for example a slow speed accident and/or an accident involving a relatively low mass passenger. In this type of accident situation, as the passenger impacts with the airbag 1 under relatively low-load, the internal gas pressure within the airbag 1, following initial inflation of the airbag 1, is caused to increase slightly and hence, as illustrated, the inner elastic membrane 5 is caused to stretch and deform outwardly by a small amount. In this low-load impact situation, it will be seen that the degree of deformation caused to the inner elastic membrane 5 by the internal gas pressure of the airbag 1 is small enough to ensure that the vent-hole 7 is always spaced from the inner surface of the pucker 10, which means that gas is allowed to vent from the inflatable chamber 3, through the vent-hole 7 and out from underneath the pucker 10, for example as illustrated by arrow 13 in FIG. 3.

Figure 4:
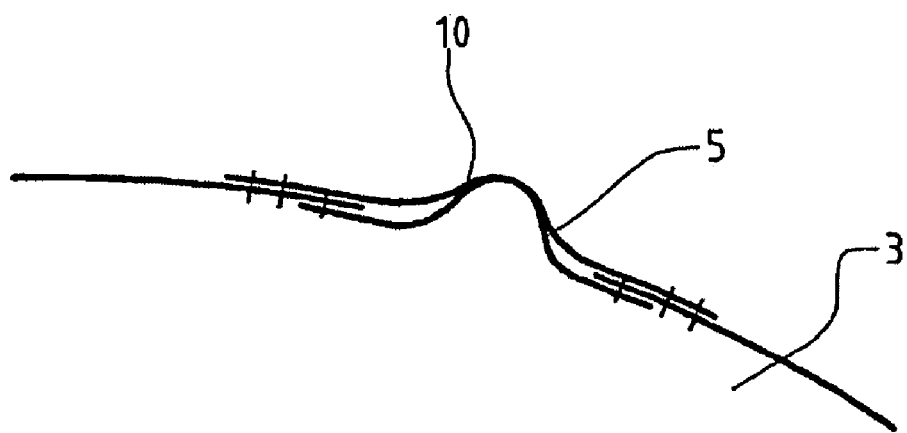
FIG. 4 is a view corresponding generally to that of FIG. 3, but illustrating the vent-hole arrangement in a high-load impact situation.

In contrast to the situation illustrated in FIG. 3, FIG. 4 illustrates the vent-hole arrangement in a condition that it adopts during a high-load impact situation, such as, for example, a higher speed crash, and/or a crash involving an occupant having a higher mass. It should be appreciated that in such an impact situation, the passenger of the motor vehicle to be protected by the airbag 1 will have a higher degree of inertia, which will mean that a higher load is applied to the airbag 1 as the occupant impinges on the airbag 1. This means that the internal gas pressure of the inflatable chamber 3 will increase more quickly and to a higher level than in the case illustrated in FIG. 3. The inner elastic membrane 5 responds to this higher increase of gas pressure, and is configured such that, if the internal gas pressure of the inflatable chamber 3 exceeds a predetermined value, then the central region of the inner elastic membrane 5 stretches and bears against the pucker 10, and effectively seals against the undersurface of the pucker 10, around the vent-hole 7. This, therefore, closes the vent-hole 7 and prevents outflow of gas from the inflatable chamber 3, thereby preventing further collapse of the airbag 1 and hence preventing "strike-through" of the seat occupant with respect to the airbag 1.

It should be appreciated that the above-described invention provides a simple vent arrangement which permits venting in a low-load condition, but which prevents venting in a high-load condition in order to prevent protection to a passenger of the motor vehicle from "strike-through" injuries.

In the present specification "comprises" means "includes or consists of" and "comprising" means "including or consisting of".

The features disclosed in the foregoing description, the following claims, or the accompanying drawings, expressed in their specific forms or in terms of a means for performing the disclosed function, or a method or process for attaining the disclosed result, as appropriate, may separately, or in any combination of such features, be utilized for realizing the invention in diverse forms thereof.

The invention claimed is:

1. An inflatable airbag defining an inflatable chamber for fluid connection to an inflator, the airbag comprising:
   an elastic inner membrane provided in a peripheral wall of the airbag;
   a vent-hole formed through the elastic inner membrane; and
   an outer membrane provided on the outside of the airbag so as to extend across at least part of the inner membrane and the vent-hole, the outer membrane defining a pucker over the part of the inner membrane, the pucker being open so as to define an outlet flow path from the vent-hole when the part of the inner membrane is spaced from the pucker; the inner membrane being configured to stretch and seal against the pucker, around the vent-hole, when internal pressure within the inflatable chamber exceeds a predetermined value,
   wherein the pucker takes the form of a loose fold across the outer membrane and is open at both of its ends.

2. The airbag according to claim 1, wherein the inner membrane is made of silicone.

3. The airbag according to claim 1, wherein the inner membrane has more than one vent-hole.

4. The airbag according to claim 1, wherein the airbag is made of fabric and the inner membrane is secured across an aperture formed in the fabric.

5. The airbag according to claim 4, wherein the inner membrane is stitched to the fabric of the airbag.

6. The airbag according to claim 4, wherein the inner membrane is glued to the fabric of the airbag.

7. The airbag according to claim 1, wherein the outer membrane comprises a strip of fabric stitched to the airbag over the vent-hole for creating an outlet flow path from the vent-hole to open-to-atmosphere ends of the pucker.

8. A flow regulation valve in combination with an airbag having a deflatable inner chamber, the valve comprising:
   an elastic inner membrane fastened to an interior of the airbag;
   a vent-hole formed through the inner membrane;
   an outer membrane fastened to an exterior of the airbag so as to extend across at least part of the vent-hole; and
   a pucker in the form of a loose fold across the outer membrane and over the vent-hole for creating an outlet flow path from the vent-hole to open-to-atmosphere ends of the pucker when the inner membrane is spaced from the pucker, and for closing the outlet flow path when an internal pressure within the deflatable inner chamber exceeds a predetermined value.

9. The valve according to claim 8, wherein the inner membrane is made of silicone.

10. The valve according to claim 8, wherein the inner membrane has more than one vent-hole.

11. The valve according to claim 8, wherein the airbag is made of fabric and the inner membrane is secured across an aperture formed in the fabric.

12. The valve according to claim 11, wherein the inner membrane is stitched to the fabric of the airbag.

13. The valve according to claim 11, wherein the inner membrane is glued to the fabric of the airbag.

14. The valve according to claim 8, wherein the outer membrane comprises a strip of fabric stitched to the airbag.

15. A flow regulation valve in combination with an airbag having a deflatable inner chamber, the valve comprising:
   an airbag material defining the deflatable inner chamber of the airbag;
   an inner membrane secured to an inner surface of the airbag material;
   a vent through a central part of the inner membrane for allowing air to be expelled from the deflatable inner chamber of the airbag; and
   an outer membrane secured to an outer surface of the airbag material creating a raised pucker over the vent-hole, wherein the inner membrane seals against the outer membrane preventing air from expelling through the vent-hole when an inner air pressure exceeds a predetermined threshold; wherein the raised pucker creates an outlet flow path from the vent-hole to at least one open-to-atmosphere end of the outer membrane when the inner membrane is spaced from the raised pucker.

16. The valve according to claim 15, wherein the inner membrane includes more than one vent-hole.

17. The valve according to claim 15, wherein the inner membrane is one of stitched and glued to the airbag material.

18. The valve according to claim 15, wherein the inner membrane material is one of elastic, fabric, and silicone.

19. An inflatable airbag defining an inflatable chamber for fluid connection to an inflator, the airbag comprising:
   an elastic inner membrane provided in a peripheral wall of the airbag;
   a vent-hole formed through the elastic inner membrane; and
   an outer membrane provided on the outside of the airbag so as to extend across at least part of the inner membrane and the vent-hole, the outer membrane defining a pucker over the part of the inner membrane, the pucker being open so as to define an outlet flow path from the vent-hole when the part of the inner membrane is spaced from the pucker; the inner membrane being configured to stretch and seal against the pucker, around the vent-hole, when internal pressure within the inflatable chamber exceeds a predetermined value,
   wherein the outer membrane comprises a strip of fabric stitched to the airbag over the vent-hole for creating an outlet flow path from the vent-hole to open-to-atmosphere ends of the pucker.

* * * * *